United States Patent
Reischmann et al.

(10) Patent No.: US 9,574,384 B1
(45) Date of Patent: Feb. 21, 2017

(54) INFINITELY VARIABLE ANGLE CONNECTING SYSTEM

(71) Applicants: Michael J. Reischmann, Eustis, FL (US); Nigel G. Jones, Eustis, FL (US)

(72) Inventors: Michael J. Reischmann, Eustis, FL (US); Nigel G. Jones, Eustis, FL (US)

(*) Notice: Subject to any disclaimer, the term of this patent is extended or adjusted under 35 U.S.C. 154(b) by 0 days.

(21) Appl. No.: 14/862,970

(22) Filed: Sep. 23, 2015

(51) Int. Cl.
*E05D 5/02* (2006.01)
*E05D 11/10* (2006.01)
*E05D 5/08* (2006.01)
*E05D 3/02* (2006.01)

(52) U.S. Cl.
CPC ............ *E05D 11/10* (2013.01); *E05D 3/02* (2013.01); *E05D 5/08* (2013.01); *E05D 2011/1092* (2013.01)

(58) Field of Classification Search
CPC .. Y10T 16/5472; Y10T 16/558; Y10T 16/534; Y10T 16/5345; Y10T 16/554; Y10T 16/540345; Y10T 403/7062; Y10T 403/4674; Y10T 403/4677; Y10T 403/32163; Y10T 403/32172; Y10T 403/32213; Y10T 403/32254; Y10T 403/32262; E05D 3/02; E05D 3/10; E05D 5/08; E05D 5/121; E05D 7/00; E05D 7/0018; E05D 11/081; E05D 11/087; E05D 11/1035; E05D 11/1028; E05D 11/1007; E05D 11/10; E05Y 2900/40; F16M 2200/02; F16M 2200/021; F16M 2200/022; F16M 13/02; F16M 13/022; F16M 13/025; F16M 7/0433; F16M 7/044; F16M 11/04; F16M 11/041; F16M 11/06; F16M 11/08
See application file for complete search history.

(56) References Cited

U.S. PATENT DOCUMENTS

| | | | | | |
|---|---|---|---|---|---|
| 970,751 | A * | 9/1910 | Pranke | ............... | A01K 97/10 135/16 |
| 1,793,013 | A * | 2/1931 | Robertson | ............... | E05F 1/061 16/253 |
| 2,326,941 | A * | 8/1943 | Heitner | ............... | E04G 7/20 403/286 |
| 2,329,369 | A * | 9/1943 | Haver | ............... | F16L 11/18 285/145.3 |
| 2,775,806 | A * | 1/1957 | Love | ............... | F16L 23/06 24/271 |
| 2,937,037 | A * | 5/1960 | Woolsey | ............... | F16L 27/1133 277/616 |
| 3,023,989 | A * | 3/1962 | White | ............... | F16L 3/2235 174/135 |
| 3,113,791 | A * | 12/1963 | Frost | ............... | F16L 17/04 24/270 |
| 3,268,946 | A * | 8/1966 | Case | ............... | E06B 11/04 16/253 |
| 3,773,375 | A * | 11/1973 | Nehls | ............... | E04D 13/106 15/105 |
| 4,408,788 | A * | 10/1983 | Beukema | ............... | F16L 23/08 285/112 |
| 4,729,149 | A * | 3/1988 | Brunkan | ............... | E06B 11/04 16/252 |
| 4,951,349 | A * | 8/1990 | Dietrich | ............... | E05D 11/087 16/228 |
| 5,348,054 | A * | 9/1994 | Oertli | ............... | D03C 1/144 139/57 |

(Continued)

Primary Examiner — Chuck Mah

(57) ABSTRACT

Each of two turret-shaped modules has a generally hemispherical configuration facing outwardly and a disk-shaped flange facing inwardly. The flanges are similarly configured with a planar surface and circular periphery. An axial bore extends centrally through each module parallel with the planar surfaces for receiving and supporting first and second cylindrical objects. A V-band encompasses the flanges with the planar surfaces in contact with each other. The clamp includes a rotatable member to loosen and tighten the clamp. In this manner, the flanges and modules are rotated and fixed with respect to the received and supported cylindrical objects.

5 Claims, 3 Drawing Sheets

(56) References Cited

U.S. PATENT DOCUMENTS

| | | | | |
|---|---|---|---|---|
| 5,509,702 | A * | 4/1996 | Warehime | F16L 23/10 24/279 |
| 5,921,694 | A * | 7/1999 | Herbermann | B25J 9/06 248/288.51 |
| 6,182,331 | B1 * | 2/2001 | Hessenthaler | E05D 5/02 16/265 |
| 6,328,269 | B1 * | 12/2001 | Krautloher | F16C 11/0614 248/288.11 |
| 6,347,776 | B1 * | 2/2002 | Chuang | F16M 11/12 248/288.51 |
| 6,386,786 | B1 * | 5/2002 | Perlman | F16B 7/04 248/540 |
| 6,907,642 | B1 * | 6/2005 | Czipri | B63B 17/02 114/364 |
| 7,562,855 | B2 * | 7/2009 | Oetlinger | B31B 1/36 248/227.4 |
| 7,850,209 | B2 * | 12/2010 | Lutzer | F16L 27/0849 285/263 |
| 2012/0230758 | A1 * | 9/2012 | Widenmeyer | F16D 1/0847 403/290 |
| 2012/0296335 | A1 * | 11/2012 | Mullaney | A61B 17/6466 606/59 |
| 2013/0165932 | A1 * | 6/2013 | Dominik | A61B 17/6466 606/59 |

* cited by examiner

INFINITELY VARIABLE ANGLE CONNECTING SYSTEM

BACKGROUND OF THE INVENTION

Field of the Invention

The present invention relates to an infinitely variable angle connecting system and more particularly pertains to receiving and retaining first and second cylindrical objects and for rotationally and axially adjusting the cylindrical objects with respect to each other, the receiving and retaining and adjusting being done in a safe, convenient, and economical manner.

SUMMARY OF THE INVENTION

In view of the disadvantages inherent in the known types of angle connecting systems of known designs and configurations now present in the prior art, the present invention provides an improved infinitely variable angle connecting system. As such, the general purpose of the present invention, which will be described subsequently in greater detail, is to provide a new and improved infinitely variable angle connecting system and method which has all the advantages of the prior art and none of the disadvantages.

To attain this, the present invention essentially comprises two turret-shaped modules. Each module is in a generally hemispherical configuration. Each module faces outwardly. Each module has a disk-shaped flange. The flange faces inwardly. The flanges are similarly configured. The flanges have a planar surface. The flanges also have a circular periphery. Each module has an axial bore. The axial bore extends centrally through each module. The axial bore is provided parallel with the planar surfaces. In this manner, the first and second cylindrical objects are received and supported.

A V-band clamp is provided. The clamp encompasses the flanges. The planar surfaces are provided in contact with each other. The clamp includes a rotatable member. In this manner the clamp is loosened and tightened. Further in this manner the flanges and modules are rotated and fixed with respect to the received and supported cylindrical objects.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved infinitely variable angle connecting system which has all of the advantages of the prior art angle connecting systems of known designs and configurations and none of the disadvantages.

It is another object of the present invention to provide a new and improved infinitely variable angle connecting system which may be easily and efficiently manufactured and marketed.

It is a further object of the present invention to provide a new and improved infinitely variable angle connecting system which is of durable and reliable constructions.

An even further object of the present invention is to provide a new and improved infinitely variable angle connecting system which is susceptible of a low cost of manufacture with regard to both materials and labor, and which accordingly is then susceptible of low prices of sale to the consuming public, thereby making such infinitely variable angle connecting system economically available to the buying public.

Lastly, another object of the present invention is to provide an infinitely variable angle connecting system for receiving and retaining first and second cylindrical objects and for rotationally and axially adjusting the cylindrical objects with respect to each other, the receiving and retaining and adjusting being done in a safe, convenient, and economical manner.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
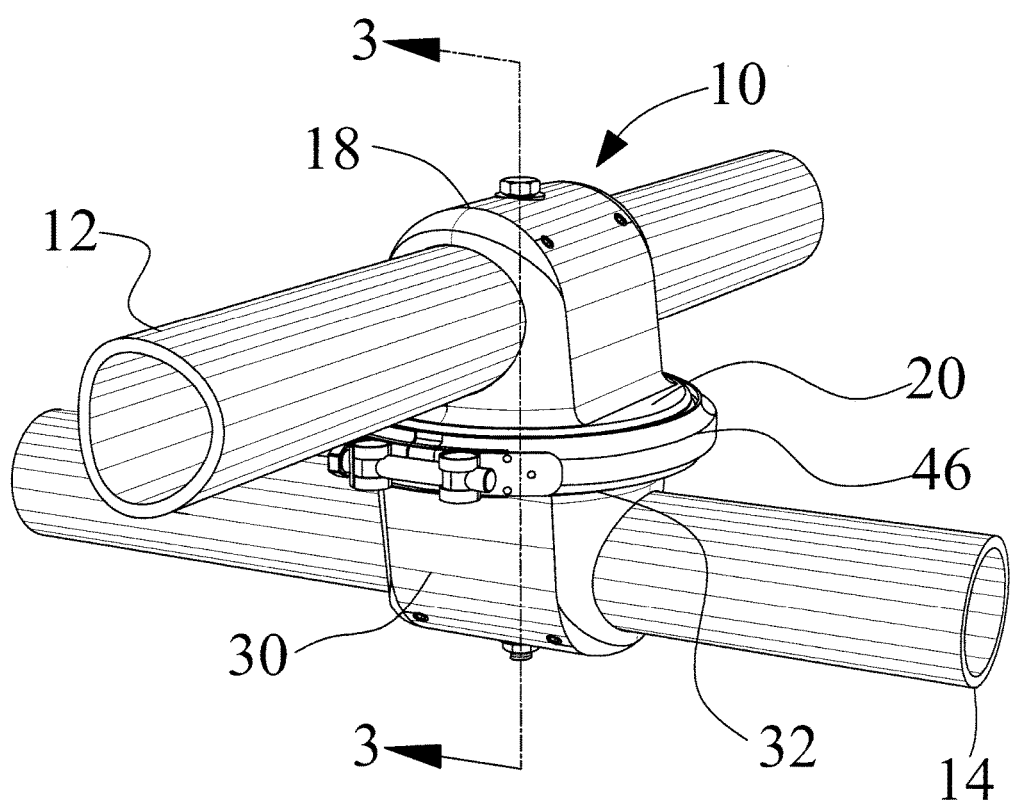
FIG. 1 is a perspective illustration of an infinitely variable angle connecting system constructed in accordance with the principles of the present invention.
Figure 2:
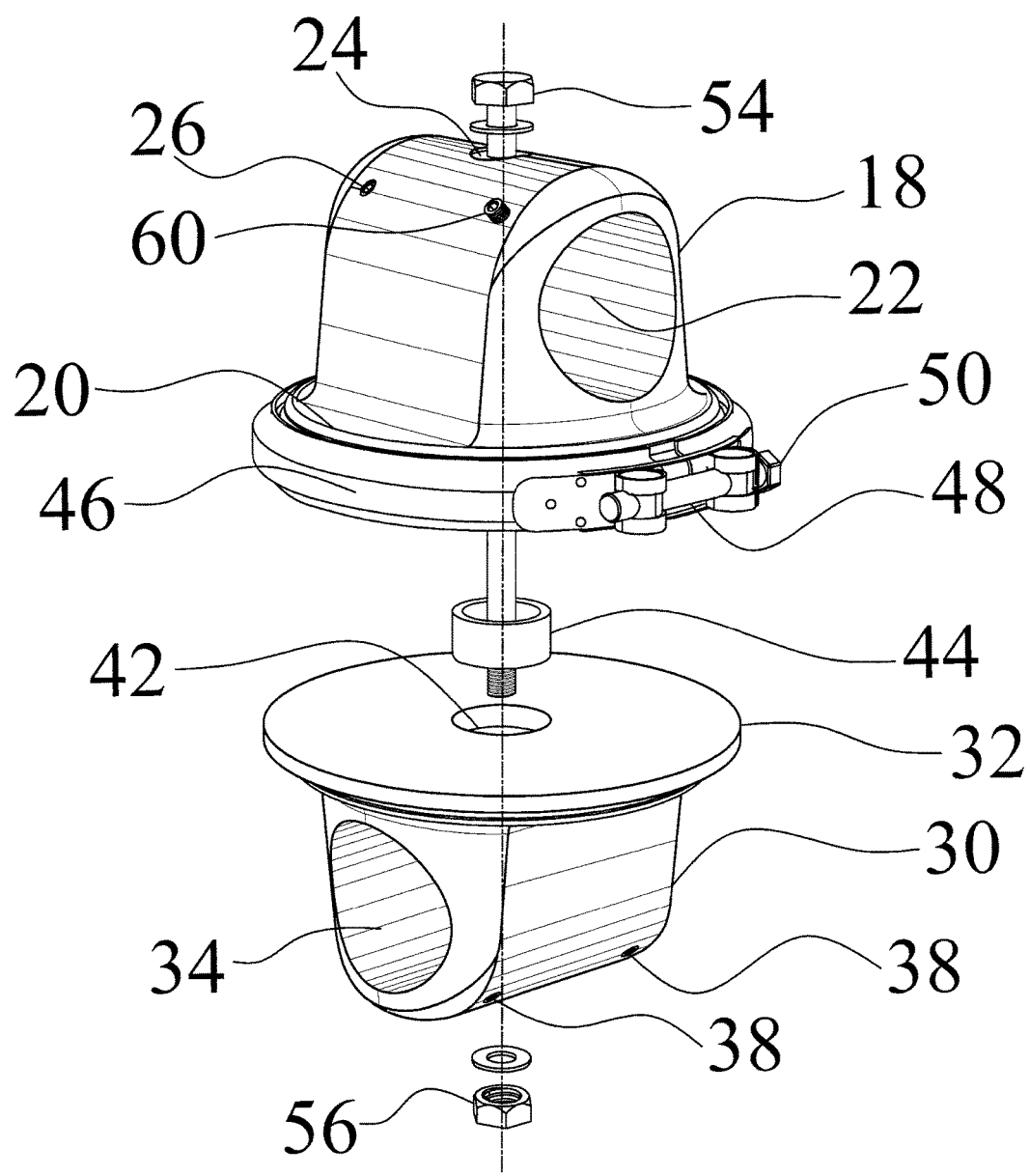
FIG. 2 is an exploded perspective illustration similar to FIG. 1 but with the connected cylinders removed.
Figure 3:
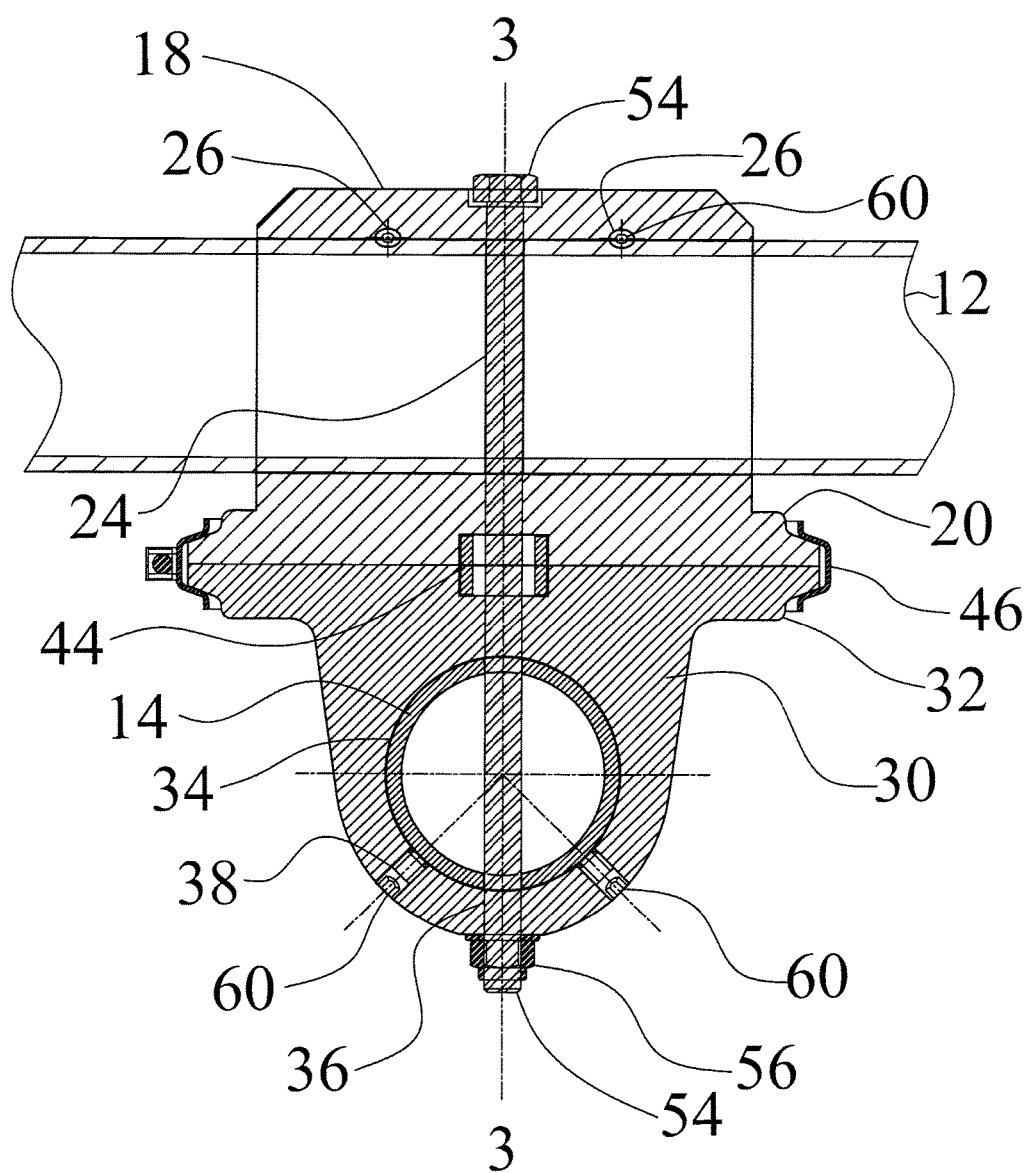
FIG. 3 is a cross sectional view taken along line 3-3 of FIG. 1.

With reference now to the drawings, and in particular to FIG. 1 thereof, the preferred embodiment of the new and improved infinitely variable angle connecting system embodying the principles and concepts of the present invention and generally designated by the reference numeral 10 will be described.

The present invention, the infinitely variable angle connecting system 10 is comprised of a plurality of components. Such components in their broadest context include two turret-shaped modules and a V-band clamp. Such components are individually configured and correlated with respect to each other so as to attain the desired objective.

From a specific standpoint, in the preferred embodiment, first provided is the first cylindrical object 12. The first cylindrical object has a first axis. A second cylindrical object 14 is provided. The second cylindrical object has a second axis. The first cylindrical object is provided in a common cross sectional configuration along its axis. The second cylindrical object is provided in a common cross sectional configuration along its axis. Each cylindrical object is fabricated of a rigid material. The rigid material is chosen from the class of rigid materials including metal, plastic, wood, composite, glass, fiber-reinforced plastic and the like.

A turret-shaped first module 18 is provided. The first module is provided in a generally hemispherical configuration. The rounded end of the first module faces outwardly. The first module has a disk-shaped first flange 20. The first flange faces inwardly. The first flange has a planar surface. The first flange has a circular periphery. The first module has an axial first bore 22. The axial bore extends centrally through the first module. The axial bore is provided parallel with the first planar surface. In this manner the first cylindrical object is received. The first module has a first unthreaded aperture 24. The first unthreaded aperture extends centrally through the first module. The first unthreaded aperture is provided perpendicular to the first planar surface. The first unthreaded aperture is provided perpendicular to the first cylindrical object within the first bore. The first module has two pair of parallel threaded apertures 26. The threaded apertures are provided remote from the first flange. The threaded apertures extend from the first bore to exterior of the first module. The threaded apertures are radial with respect to the first bore at an angle of from 50 to 70 degrees with respect to the first flange.

A turret-shaped second module 30 is provided. The second module is provided in a generally hemispherical configuration. The rounded end of the second module faces outwardly. The second module has a disk-shaped second flange 32. The second flange faces inwardly. The second flange has a planar surface. The second flange has a circular periphery. The second module has an axial second bore 34. The axial bore extends centrally through the second module parallel with the second planar surface. In this manner the second cylindrical object is received. The second module has a second unthreaded aperture 36. The second unthreaded aperture extends centrally through the second module. The second unthreaded aperture is perpendicular to the second planar surface. The second unthreaded aperture is provided perpendicular to the second cylindrical object within the second bore. The second module has a pair of parallel threaded apertures 38. The threaded apertures are formed in the second module remote from the second flange. The threaded apertures extend from the second bore to exterior of the second module. The threaded apertures are radial with respect to the second bore at an angle of from 50 to 70 degrees with respect to the second flange.

A shallow recess 42 is provided next. The recess is formed centrally into the flanges of the first and second modules coaxial with the unthreaded apertures. A bushing 44 is provided. The bushing has opposed ends. The opposed ends are positioned within the recesses. In this manner mutual rotation between the first and second modules tends to be facilitated.

Also provided is a V-band clamp 46. The V-band clamp encompasses the first and second flanges. The first and second planar surfaces are in contact with each other. The V-band clamp includes a T-bolt 48. The T-bolt has a knob or nut 50. Rotation of the knob in one direction will loosen the V-band clamp. In this manner the flanges, modules, and supported cylindrical objects are rotated. Rotation of the knob in an opposite direction will tighten the V-band clamp. In this manner the flanges, modules, and supported cylindrical objects are fixedly positioned.

Further provided is a through bolt 54. The through bolt extends through the unthreaded apertures of the first and second modules and through the bushing and through the first and second cylindrical objects. In this manner the cylindrical objects are axially and rotationally secured with respect to the first and second modules and with respect to each other. A nut 56 is provided. The nut is removably coupled to the through bolt for securement purposes.

Provided last is a set screw 60. The set screw is positioned in each threaded aperture. The set screws are adapted to be threaded into contact with the cylindrical objects. In this manner the cylindrical objects are further secured with respect to the modules.

The present invention is an infinitely variable angle connecting system which is a device which allows cylindrical objects such as pipes, tubes, rods, or planks/beams to be joined and fixed at any point along their length. By cylindrical objects it is meant to include any object with a linear axis and a constant cross sectional configuration along its axis. It is not limited to right circular cylinders, objects with circular cross sectional configurations. Moreover, the relative angles of the joined pipes, tubes, etc. can be steplessly and infinitely varied relative to each other. At the same time, round pipes, tubes, and rods can be rotated axially about their longitudinal axis, and then fixed in place. These features provide a uniquely variable geometry between the pipes, tubes, etc. to be joined by the device. The pipes, tubes, etc, to be joined are not required to have uniform cross-sectional shapes. The materials to be joined together can consist of any material having a degree of longitudinal stability, e.g. metal, plastic, wood, composites, glass, fiber-reinforced plastics.

In its basic configuration the device consists of 3 main components, namely:

(1) Two similar turret-shaped modules with integral disc-shaped flanges. The flanges of the two parts are of equal diameter, with an identical peripheral area of equal and uniform width, tapering to a uniform and equal thickness.

(2) A V-Band clamp of adjustable diameter, and somewhat flexible in nature to allow adjustment of the diameter by means of a toggle bolt.

(3) A positioning through bolt and/or positioning set screws.

The inner diameter of the V-band clamp is adjustable to such a degree that tapered inner surfaces of the V-shaped clamping band can match exactly, and clamp securely, to the tapered disc-shape flanges on the outer edge of each of the two main turret-shaped components. This will be possible when these two main components are concentric, and their two flat surfaces mated exactly one to the other. The means of adjusting the diameter of the V-band clamp is by rotating a threaded nut or knob on a T-bolt, attached permanently, or by means of a quick release mechanism at the T end to one end of the circular V-band clamp. The included angle of the inner section of the V-band clamp is equal to that of the sum of the angles of the tapered periphery of the flanges on the two main components. The flanges of the two turret-shaped modules are held captive one to the other by the V-band clamp device, so that they remain in close contact to each other whilst the V-band clamp is installed.

The V-band clamp is a known device, and we are simply using it as part of our system, but making no claims relative to the V-band clamp per se.

The pipes, rods, tubes, beams, or other cylindrical objects to be fastened one to the other are inserted into the bores of the respective turret structures. The clamping band is loosened sufficiently to allow a smooth and steplessly variable angle between the discs, as they rotate relative to each other. A bushing located centrally in counter-bores in each of the flanges serves to keep the flanges concentric when the V-band clamp is loosened during angular adjustment. Pipes, rods, and tubes to be secured by means of the system can be individually rotated about their own axis in the relevant turret bores, and also slide longitudinally through the bores.

Once the desired relative lengths and axial rotation have been achieved, these can be fixed in place by means of tightening the set screws provided in the turret shaped module. The included relative angle between the pipes, rods, or tubes can be infinitely and steplessly adjusted by rotating the flanges relative to each other. Once the correct angle has been achieved, these can be fixed in place. This is achieved by means of tightening the V-band clamp adjusting bolt, which reduces the diameter of the clamp. This action forces the inside surfaces of the V-band to create a clamping force on the periphery of the discs, perpendicular to the flat faces of the discs.

Once the clamping bolt has been properly tightened, this clamping force results in a high level of friction between the disc surfaces, as well as between the inside surfaces of the V-band clamp and the outer disc peripheries. This friction is sufficiently strong to lock in place the flanges immovably relative one to the other. By this means fixing of the relative positions of the attached pipes, rods, tubes, beams, or other members passing through the bores in each turret is achieved. After all adjustments are completed, and the V-band clamp has been tightened, the assembly can be made fully secure if desired, by installing a suitable through-bolt and nut retaining system, which penetrates fully through each rod, pipe, tube, etc and through both flanges. The through-bolts will make obsolete the longitudinal and rotational fixation provided by the set-screws in the turret shaped module.

By removing the through-bolt, set-screws, and circumferential V-band clamp, the pipes, rods, tubes, beams, or other members secured by the system can then be again moved and adjusted relative to each other, both in length and angle, as well as rotated axially. They can alternatively be removed from the system altogether, allowing the system to be re-used.

The steplessly and angularly infinitely adjustable joint system of the present invention makes the assembly of pipes, rods, tubes, beams, or planks easier and more secure, and with greater speed, accuracy and safety than any other current device having similar wide properties of adjustability.

Variations on the basic system configuration include:

i. A present system which consists of two flat discs and a v-band clamp. There are no pre-drilled or cast bores for the pipe or tube to pass through. Pipes, tubes or planks are fastened to each disk by bolts passing through the disc or threaded into it. If through-bolted, the mating surface of the disc is counter-bored to accept the heads of flat-head bolts, such that the heads are flush with, or below the level of, the disc material.

ii. A present system which consists of two discs which have open slots/channels cast or machined into the non-mating surface, arranged across the diameter. These slots can be semi-circular, elliptical, rectangular, triangular, V-shaped, semi-pentagonal, or semi-hexagonal in shape. The rods, beams, or tubes to be connected do not need to be inserted into bores. The rods, beams, or tubes are fastened to the discs as in variation i. above.

iii. A present system which has two or more bores on each disc, angled one to the other at any predetermined angle. The included angle is optional according to requirements, essentially a pipe elbow, tee, wye, or cross cast into, machined into, bolted, bonded, or otherwise affixed to the non-mating surface of the disc. Bores can be at 90 degrees to each other, or any other angle.

iv. A present system in which the non-mating surface is flat or has a single bore, but the surface or bore is not parallel to the mating surface. Instead, it is manufactured with a predetermined angle to suit a particular purpose; for example, constructing permanent structures such as Geodesic domes from metal pipe, plastic pipe, or wooden beams and planks etc. The advantage of the system over a similar fixed angle jointing device is that by varying the angle, structures of varying size can be constructed using the same basic system.

Some possible applications for the present system outside of our intended use in the present system are:

1. The discs are made from plastic material, such as PVC or ABS. They have industry standard sized bores integral to the discs. This version of the present invention is designed and intended to create complex, multi-angled structures using standardized sizes of "plastic" pipe or tube. It can be used in conjunction with existing joint structures already in use for joining "plastic" pipe.

2. The discs are made of stamped or cast metal, and are flat on the non-mating face. This type of the present system is intended for use with metal, wood, plastic, or composite materials which are not round in shape, and not necessarily symmetrical in shape. These discs would allow the joining together of materials of dissimilar widths and thicknesses. These dimensions would not be limited by the diameters of the discs.

Examples of use are: (A) joining angular metal tubing, for example, rectangular, triangular, hexagonal, etc. and (B) joining wooden or other natural materials of rectangular, round, or irregular shape to each other at varying angles. Some examples of uses for the present system for (A) and (B) in 2. above are: constructing emergency shelter from locally sourced materials, wood, PVC pipe, bamboo, etc. where only the relatively small and lightweight systems need to be brought to the construction site from distant locations.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An infinitely variable angle connecting system comprising:
   two turret-shaped modules, the modules having a common central axis, each having a generally hemispherical configuration with a rounded end facing outwardly and a disk-shaped flange facing inwardly with regard to the central axis, the flanges being similarly configured with a planar surface and a circular periphery, an axial bore extending centrally through each module parallel with the planar surfaces for receiving and supporting first and second cylindrical objects; and
   a V-band clamp encompassing the flanges with the planar surfaces in contact with each other, the V-band clamp including a rotatable member to loosen and tighten the V-band clamp for rotating and fixing the flanges and the modules with respect to the received and supported cylindrical objects.

2. The system as set forth in claim 1 and further including a securement member in each module to supplement the V-clamp in the securement of the cylindrical objects in the modules.

3. The system as set forth in claim 2 wherein once the desired relative lengths and axial rotation of cylindrical objects have been achieved, the subsequent securement method includes the drilling of an appropriately sized hole through both cylindrical objects and inserting a through bolt extending through unthreaded apertures of the first and second modules to axially and rotationally secure the cylindrical objects not only with respect to the modules but also the modules one to the other.

4. The system as set forth in claim 2 wherein the securement member includes two pair of set screws positioned in four threaded apertures, the four set screws adapted to be threaded into contact with the cylindrical objects for securing the cylindrical objects with respect to the modules.

5. An infinitely variable angle connecting system (10) for receiving and retaining first and second cylindrical objects (12), (14) and for rotationally and axially adjusting the cylindrical objects with respect to each other, the receiving and retaining and adjusting being done in a safe, convenient and economical manner, the system comprising, in combination:
   the first cylindrical object (12) having a first axis and the second cylindrical object (14) having a second axis, the first cylindrical object having a common cross sectional configuration along its axis, the second cylindrical object having a common cross sectional configuration along its axis, each cylindrical object being fabricated of a rigid material chosen from the class of rigid material including, but not limited to metal, plastic, wood, composite, glass, fiber-reinforced plastic;
   a turret-shaped first module (18) having a generally hemispherical configuration with a rounded end facing outwardly and a disk-shaped first flange (20) facing inwardly, the first flange having a planar surface with a circular periphery, an axial first bore (22) extending centrally through the first module parallel with the first planar surface for receiving the first cylindrical object, a first unthreaded aperture (24) extending centrally through the first module perpendicular to the first planar surface and perpendicular to the first cylindrical object within the first bore, two pair of parallel threaded apertures (26) formed in the first module remote from the first flange, the threaded apertures extending from the first bore to exterior of the first module, the threaded apertures being radial with respect to the first bore at an angle of from 50 to 70 degrees with respect to the first flange;
   a turret-shaped second module (30) having a generally hemispherical configuration facing outwardly and a disk-shaped second flange (32) facing inwardly, the second flange having a planar surface with a circular periphery, an axial second bore (34) extending centrally through the second module parallel with the second planar surface for receiving the second cylindrical object, a second unthreaded aperture (36) extending centrally through the second module perpendicular to the second planar surface and perpendicular to the second cylindrical object within the second bore, two pair of parallel threaded apertures (38) formed in the second module remote from the second flange, the threaded apertures extending from the second bore to exterior of the second module, the threaded apertures being radial with respect to the second bore at an angle of from 50 to 70 degrees with respect to the second flange;
   a shallow recess (42) formed centrally into the flanges of the first and second modules coaxial with the unthreaded apertures, a bushing (44) having opposed ends positioned within the recesses tending to facilitate mutual rotation between the first and second modules;
   a V-band clamp (46) encompassing the first and second flanges with the first and second planar surfaces in contact with each other, the V-band clamp including a T-bolt (48) with a knob/nut (50), rotation of the knob/nut in one direction will loosen the V-band clamp for rotating the flanges and modules and supported cylindrical objects while rotation of the knob in an opposite direction will tighten the V-band clamp for fixedly positioning the flanges and modules and supported cylindrical objects;
   a through bolt (54) extending through the unthreaded apertures of the first and second modules and through the bushing and through the first and second cylindrical objects to axially and rotationally secure the cylindrical objects with respect to the first and second modules and with respect to each other, a nut (56) removably coupled to the through bolt for securement purposes; and
   a set screw (60) positioned in each threaded aperture, the set screws adapted to be threaded into contact with the cylindrical objects for further securing the cylindrical objets with respect to the modules.

* * * * *